C. O. WYMAN.
POWER TRANSMITTING CHAIN.
APPLICATION FILED JUNE 12, 1915.
1,310,726.
Patented July 22, 1919.
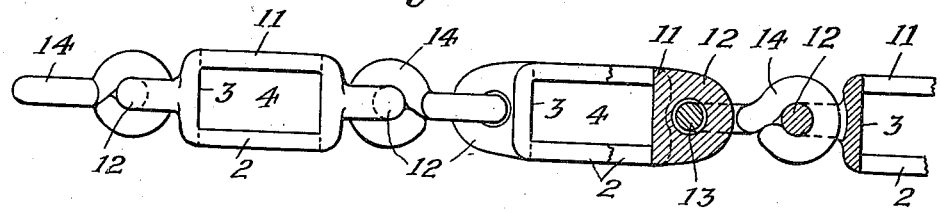
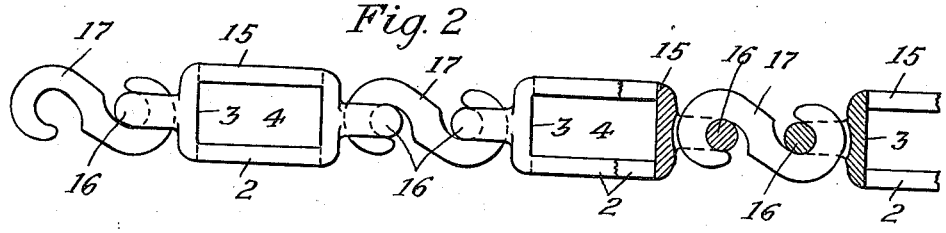
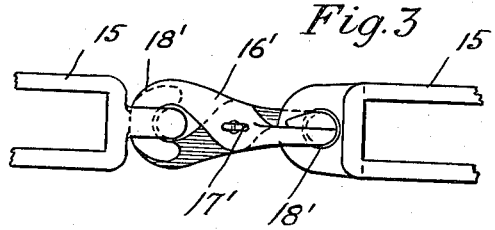
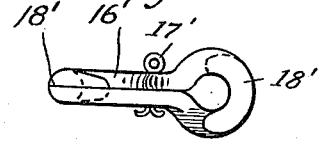
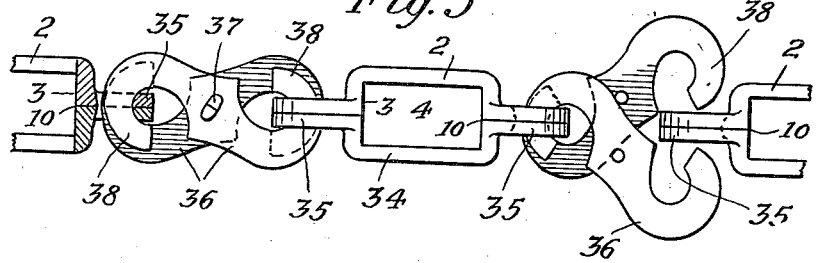
Inventor:
Charles O. Wyman
By Paul & Paul
his Attorneys.

UNITED STATES PATENT OFFICE.

CHARLES O. WYMAN, OF ANOKA, MINNESOTA.

POWER-TRANSMITTING CHAIN.

1,310,726.  Specification of Letters Patent.  Patented July 22, 1919.

Application filed June 12, 1915. Serial No. 33,678.

*To all whom it may concern:*

Be it known that I, CHARLES O. WYMAN, citizen of the United States, resident of Anoka, county of Anoka, State of Minnesota, have invented certain new and useful Improvements in Power-Transmitting Chains, of which the following is a specification.

The object of my invention is to provide a chain for transmitting power where the driven wheel is located in a plane at an angle to that of the driving wheel.

A further object is to provide a chain of simple construction and one which will be extremely strong and durable for the transmission of power.

The invention consists generally in various constructions and combinations, all as hereinafter described and particularly pointed out in the claims.

In the accompanying drawings forming part of this specification,

Figure 1 is a view showing a modified form of connection between the links,

Fig. 2 illustrates another style of connection,

Figs. 3 and 4 are detail views illustrating a modified form of the coupling between the links, Fig. 5 illustrates a longitudinally divided link with a modified type of coupling between the adjoining links.

In Fig. 1 of the drawing, the links 11 comprise four equally spaced bars 2 connecting heads 3. These bars coöperate with the heads to form four rectangular openings 4 running lengthwise of the link and adapted to receive the teeth of a sprocket wheel. The heads 3 are provided with centrally arranged ears or lugs 12, there being one at each end of the link and both lugs being in substantially the same plane. When the lugs are assembled, the lugs of adjacent links are arranged with their planes at right angles to one another and holes 13 are provided in the lugs to receive hooks 14, the ends of which are bent into planes at right angles to one another to enter the holes in the lugs.

In Fig. 2 links 15 are provided, having loops 16 at each end which are engaged by S-shaped hooks 17, the loops of adjacent links being in substantially the same plane.

In Figs. 3 and 4 a modified form of connection is shown between the links, consisting of hook members divided longitudinally into sections 16' having a pivotal connection between them, the ends of said sections being curved to form hooks 18' which lap by one another when they are engaged with the ends of the links. The hook members are connected at their middle portion by a pivot pin 17'.

In Fig. 5 links 34 are shown composed of divided sections having ears 35 at each end and couplings consisting substantially of S-shaped members 36 divided longitudinally and having their middle portions connected by a pivot 37. The S-shaped members have their hooked portions 38 oppositely arranged, so that when they are in engagement with the lugs 35 on the ends of the links the entrance to one hook will be closed by the shank of the adjacent hook and it will be necessary to remove the pivot pin and disengage the hooks from the lugs before the sections can be separated to allow the adjacent links to be disengaged from one another.

I claim as my invention:

1. A power transmitting chain comprising links having a plurality of faces and openings formed in said faces to receive the teeth of a sprocket wheel, and couplings having hooks at their ends for connecting the ends of adjacent links, said couplings being mounted for universal joint connection between the links.

2. A power transmitting chain comprising box links having four faces formed thereon and rectangular openings in said faces to receive the teeth of a sprocket wheel, and couplings connecting the ends of adjacent links, said couplings being mounted for universal joint connection between the links.

3. A power transmitting chain comprising skeleton links having a plurality of openings and a corresponding number of opposing faces, and couplings having hooked ends and divided longitudinally for connecting the adjacent ends of adjoining links.

In witness whereof, I have hereunto set my hand this 23rd day of March, 1915.

CHARLES O. WYMAN.

Witnesses:
 EDWARD A. PAUL,
 GENEVIEVE E. SORENSEN.

Copies of this patent may be obtained for five cents each, by addressing the "Commissioner of Patents, Washington, D. C."